(12) United States Patent
Erskine et al.

(10) Patent No.: US 9,453,780 B2
(45) Date of Patent: Sep. 27, 2016

(54) MODULE FOR DETERMINING AN OPERATING CHARACTERISTIC OF A BEARING

(71) Applicant: Aktiebolaget SKF, Gothenburg (SE)

(72) Inventors: Joseph Erskine, Falkirk (GB); Keith Hamilton, Fife (GB); Brian Murray, Aberdeen (GB); Andreas Clemens van der Ham, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/395,502

(22) PCT Filed: Nov. 23, 2012

(86) PCT No.: PCT/EP2012/073529
§ 371 (c)(1),
(2) Date: Oct. 21, 2014

(87) PCT Pub. No.: WO2013/159837
PCT Pub. Date: Oct. 31, 2013

(65) Prior Publication Data
US 2015/0168257 A1    Jun. 18, 2015

Related U.S. Application Data

(60) Provisional application No. 61/637,539, filed on Apr. 24, 2012.

(51) Int. Cl.
*G01M 13/04* (2006.01)
*F16C 41/00* (2006.01)
(Continued)

(52) U.S. Cl.
CPC .......... *G01M 13/045* (2013.01); *F16C 19/522* (2013.01); *F16C 19/525* (2013.01);
(Continued)

(58) Field of Classification Search
CPC .......... F16C 32/04; F16C 19/36; G01P 3/44; G01P 3/42
USPC ..................................... 73/862.322
See application file for complete search history.

(56) References Cited

U.S. PATENT DOCUMENTS 6,535,135 B1 * 3/2003 French .................. B61K 9/04
340/682
7,270,016 B2 * 9/2007 Sentoku .............. B60B 27/0005
73/862.322
(Continued)

FOREIGN PATENT DOCUMENTS

| CN | 1405543 A | 3/2003 |
|---|---|---|
| CN | 1437709 A | 8/2003 |

(Continued)

*Primary Examiner* — Lisa Caputo
*Assistant Examiner* — Octavia Hollington
(74) *Attorney, Agent, or Firm* — Bryan Peckjian; SKF USA Inc. Patent Dept.

(57) ABSTRACT

A measurement module for monitoring an operating condition of a roller bearing having a first bearing ring and a second bearing ring rotating with respect to each other around a rotation axis comprises an energy harvesting device operable to generate energy from a relative movement between the first and second bearing rings and at least one deformation sensor operable to provide a deformation signal indicative of a deformation of a surface region of one bearing ring of the first and the second bearing rings. The deformation sensor is powered by the energy harvesting device. An evaluation circuit is operable to determine, using the deformation signal, a strain signal indicative of a present load on the bearing. The evaluation circuit is powered by the energy harvesting device and a common housing encloses the energy harvesting device, the deformation sensor and the evaluation circuit.

19 Claims, 2 Drawing Sheets

(51) Int. Cl.
*F16C 19/52* (2006.01)
*F16C 33/58* (2006.01)
*G01K 13/00* (2006.01)

(52) U.S. Cl.
CPC ............ *F16C 33/58* (2013.01); *F16C 33/586* (2013.01); *F16C 41/00* (2013.01); *F16C 41/004* (2013.01); *F16C 41/008* (2013.01); *G01K 13/00* (2013.01)

(56) References Cited

U.S. PATENT DOCUMENTS 7,780,357 B2 * 8/2010 Varonis .................. G01P 3/443
324/178
8,539,811 B2 * 9/2013 Wilhelmy ............... F16C 19/52
702/182
8,961,021 B2 * 2/2015 Stubenrauch ......... F16C 41/008
384/448
2007/0074587 A1 * 4/2007 Mol ...................... G01L 5/0019
73/862.322

FOREIGN PATENT DOCUMENTS

| | | |
|---|---|---|
| CN | 102265046 A | 11/2011 |
| WO | 02/01086 A2 | 1/2002 |

\* cited by examiner

MODULE FOR DETERMINING AN OPERATING CHARACTERISTIC OF A BEARING

CROSS REFERENCE TO RELATED APPLICATIONS

This is a National Stage application claiming the benefit of International Application Number PCT/EP2012/073529 filed on 23 Nov. 2012, which claims the benefit of U.S. Provisional Patent Application No. 61/637,539 filed on 24 Apr. 2012, both of which are incorporated herein by reference in their entireties.

FIELD OF THE INVENTION

Embodiments of the present invention relate to condition monitoring of roller bearings and in particular to a measurement module for monitoring an operating condition of a roller bearing having a first bearing ring and a second bearing ring rotating with respect to each other.

BACKGROUND OF THE PRESENT INVENTION

Condition monitoring of roller bearings is of increasing importance, particularly in applications with roller bearings of intermediate and greater size, such as for example the roller bearings used in wind energy converters or in other types of power plants, in general.

One particular example of an operating condition to be monitored is the monitoring of the present load on the bearing, which has significant impact on the calculating of a remaining service live, the occurrence of over-load conditions or of under-load conditions etc. However, apart from directly gathering information on operating conditions of a roller bearing, condition monitoring may also be utilized to determine useful information on a major system embodying the particular roller bearing. For example, if roller bearings in the hubs or wheels of an automobile are employing load sensing, the individual load on the wheels may be determined such as to, for example, electronically control the amount of power provided to each driven wheel or the amount of braking power applied to each of the wheels.

Despite its undeniable benefits, condition monitoring of roller bearings is only rarely used, since different types of sensors, evaluation electronics and communication electronics utilized to communicate the determined load or another operating condition to a monitoring circuit have to be separately installed on the roller bearing, wired together and provided with operating energy. It may be rather time consuming and expensive to individually attach the different sensor types and the associated evaluation electronics and energy sources to the roller bearings. Furthermore, conventional solutions require excessive amounts of additional space in the environment of the roller bearing so that typically completely new constructions had to be performed, when condition monitoring had to be integrated into a roller bearing.

Hence, there is a desire for a concept allowing to implement condition monitoring in roller bearings more efficiently.

BRIEF SUMMARY OF THE PRESENT INVENTION

Embodiments of the present invention allow this by providing a measurement module for monitoring an operating condition of a roller bearing having a first bearing ring and a second bearing ring rotating with respect to each other around a rotation axis, wherein the module comprises an energy harvesting device operable to generate energy from a relative movement between the first and second bearing rings and at least one deformation sensor operable to provide a deformation signal indicative of a deformation of a surface region of one bearing ring of the first and the second bearing rings. An evaluation circuit is operable to determine, using the deformation signal, a strain signal indicative of a present load on the bearing and is powered by the energy harvesting device as well as the deformation sensor. A common housing encloses the energy harvesting device, the deformation sensor and the evaluation circuit. That is, all components required to perform load sensing of a load on a roller bearing are provided within a common housing such as to be able to provide the capability to monitor an operating characteristic of a roller bearing by simply mounting an embodiment of a measurement module to the roller bearing. While utilizing an embodiment of the present invention, a full functionality of load monitoring may be provided without the additional need to apply individual sensors or components in the vicinity of the roller bearing and to afterwards wire those components together.

To this end, it may also become feasible to implement condition monitoring into already existing constructions or environments by utilizing an embodiment of a measurement module according to the present invention to attach it to an existing roller bearing, particularly to a side face thereof.

This may particularly be the case, when so-called "side load measurement" is utilized. This may particularly be the case, when the deformation sensor is operable to determine a deformation of a surface region which is essentially perpendicular to the rotation axis. That is, in the example of a radial bearing, the deformation sensor would be operable to provide a deformation signal that is indicative of a deformation of a radially extending side face of the bearing ring. To this end, any kind of sensor may be used, which is capable of sensing a deformation of a surface region of a bearing ring, such as for example capacitive or optical sensors (lasers), capable to determine a distance between the surface with respect to a reference surface or, as a further example, strain gauges attached to the surface in the surface region so that elastic deformations of the surface and hence of the bearing ring may be sensed by an associated elongation or compression of the one or more strain gauges attached to the surface.

That is, particularly compact implementations of measurement modules may become feasible by utilizing side load measurement, which is based on the sensing and further processing of a deformation of a surface region on a bearing ring which is essentially perpendicular to the rotation axis. More generally, with side load measurement, a deformation of a surface region which is substantially different than any surface parallel to the rotation axis may be utilized. The deformation of such a surface region is caused by the load as transferred from the inner ring to the outer ring via the rolling elements of the bearing. In particular, when a rolling element passes an area neighboured to the particular surface region, the load as transferred via the rolling element causes an elastic deformation of the inner or outer ring and hence a deformation of the surface region of the bearing ring. Even when the vector of the main load on the roller bearing points into a different direction than the surface normal of the surface region, a conclusion on the direction and the strength of the load vector can be drawn when the mechanical characteristics of the roller bearing, in particular the material and the dimensions of the bearing rings and the number, dimension and material of the rolling elements are known. The determination of the load vector may, for example, be performed using Finite Element Analysis Methods (FEM), modelling the deformation characteristic of the roller bearing in different operating conditions, for example at different load vector directions, temperatures or the like. This concept may be utilized to determine the load on radial bearings as well as on axial bearings.

Examples of radial bearings are deep-groove ball-bearings, spherical roller bearings, angular contact ball bearings, cylindrical roller bearings, needle roller bearings, and taper roller bearings. For example, a deep-groove ball-bearing is designed for supporting predominantly radial loads, whereas a spherical roller bearing is typically designed for accommodating both heavy radial loads as well as heavy axial loads. In a radial bearing, the first ring and the second ring are not only co-axial but also concentric. That is, one of the first ring and the second ring (i.e., the inner ring) lies concentrically within the other one of the first ring and the second ring (i.e., the outer ring), and the first ring and the second ring lie in substantially the same plane substantially perpendicular to the axis. The paths traversed by the plurality of rolling elements, when the radial bearing is in operational use, are concentric with the first ring and the second ring. The inner ring and the outer ring form a coplanar configuration and rotate coaxially relative to each other.

In an axial bearing, the first ring and the second ring are arranged so as to be co-axial, but not concentric. The first ring lies in a first plane substantially perpendicular to the axis, and the second ring lies in second plane substantially perpendicular to the axis and spaced apart from the first plane. The paths traversed by the plurality of rolling elements when the axial bearing is in operational use, are coaxial with the first ring and the second ring, but lie in another plane substantially parallel with the first plane and second plane.

In integrating the energy source, i.e. an energy harvesting device independent from any further cabling or wiring, the deformation sensor and an evaluation circuit operable to perform signal processing on the deformation signal as provided by the deformation sensor may into a single module, all the functionality required to provide condition monitoring of a roller bearing is united into a single housing. This may provide the required functionality by simply mounting the measurement module as a whole to a bearing ring of a roller bearing, irrespective of whether it is a radial roller bearing or an axial roller bearing.

According to some embodiments of the present invention, the energy harvesting device is operable to generate the energy from a magnetic field of varying flux, i.e. without acquiring physical contact to the opposing bearing ring, which is the bearing ring opposite to the one the measurement module is mounted to. To this end, the energy harvesting device may, for example, comprise one or more coils in order to sense the flux of a magnet assembly of permanent magnets as mounted to the opposing bearing ring. As compared to other embodiments, where the energy harvesting device requires mechanical contact to the opposing bearing ring, so as to for example drive gear wheels or the like, this may provide for the possibility to even be insensitive to slight variations or misalignments of the geometry, as for example to misalignments of the bearing rings up to $\pm 2°$ or higher.

According to some embodiments, measurement modules may be tailored to specific roller bearings in that the deformation sensor is located on a surface region of the bearing where a deformation of the surface depends on a load on the bearing according to a predetermined, particularly according to an essentially linear relationship. To this end, the position of the load sensor within the common housing may be adapted to the particular geometry of the roller bearing to be monitored in that the deformation sensor is placed on a surface region allowing for the determination of a load on the bearing with utmost precision.

According to some embodiments, this may be achieved by performing a finite element analysis of the roller bearing. According to some further embodiments, the determination of the strain signal indicative of a present load on the bearing may be based on an inverse finite element transformation so as to determine the load vector based on a finite element model of the bearing. However, a strain signal as determined by the evaluation signal does not necessarily comprise information on the load vector directly. A strain signal as understood herein does generally comprise information allowing to conclude at least implicitly on the direction and/or magnitude of the load vector. That is, further embodiments may employ simple signal processing on analog voltages or currents as determined from a strain sensor or the like so as to determine a signal indicative of a strain on the sensor. The determination of a load vector may then be based on the strain signal as determined by the evaluation circuit, which may be performed by subsequent evaluation devices or electronics.

According to some embodiments of the present invention, the contour or the border of the common housing may be tailored to the particular roller bearing in that it, at least partly, has the shape of a circular arc with a radius corresponding to the radius of the bearing ring to which the module is attached. To this end, a position of the deformation sensor with respect to the circular part of the common housing may be chosen such that the deformation sensor is located at or above the surface region when the housing is mounted on the bearing ring such that the circular arc is aligned with the radius of the bearing ring. To this end, a module may be provided such that the maximum precision for the determination of the load vector may be achieved by simply aligning the housing of the module with the bearing ring.

In order to provide the functionality within the common housing and hence to enable the implementation of the additional functionality of condition monitoring by simply attaching a measurement module according to the invention to at least one bearing ring of a roller bearing, some embodiments of the present invention provide the electrical coupling between the energy harvesting device and the deformation sensor within the common housing itself. According to a further embodiment of the present invention, a measurement module itself comprises one or more permanent magnets. This may provide for the possibility to mount two measurement modules at a roller bearing, one at either bearing ring. When both of the bearing rings comprise an energy harvesting device comprising permanent magnets used to provide the magnetic field utilized by the energy harvesting device to supply the required energy, mounting two measurement modules on a particular bearing provides for all the necessary components in order to generate energy via the energy harvesting device without the necessity to couple, for example, any further permanent magnets to one of the bearing rings directly.

According to some embodiments, the common housing furthermore comprises an acoustical transducer in order to additionally receive acoustic feedback as a further operating characteristic of the roller bearing. Acoustic feedback may be utilized, for example, by performing a frequency analysis on the received signal, to identify any frequency components in the acoustical signal of the bearing that may hint to a failure of the bearing or the necessity to apply additional lubricant or the like. An additional functionality may be implemented without any additional effort by utilizing such a measurement module. According to some embodiments, the energy harvesting device may also be coupled to an evaluation circuit in order to derive information on a rotational frequency of the bearing, based on the varying flux of the permanent magnets of the energy harvesting device.

According to further embodiments, the module furthermore comprises a wireless transmitter coupled with the evaluation circuit, the wireless transmitter being operable to transmit the strain signal or information on the strain signal to a corresponding transceiver, wherein the wireless transmitter is powered by the energy harvesting device. This allows to not only derive the necessary information without any external wiring but also to transmit the information without having to attach any further components to the bearing than an embodiment of the measurement module.

Wireless transmitters with this respect may, for example correspond to one of the mobile communication systems or transceivers standardized by the 3rd Generation Partnership Project (3GPP), as Global System for Mobile Communications (GSM), Enhanced Data rates for GSM Evolution (EDGE), GSM EDGE Radio Access Network (GERAN), Universal Terrestrial Radio Access Network (UTRAN) or Evolved UTRAN (E-UTRAN), e.g. Universal Mobile Telecommunication System (UMTS), Long Term Evolution (LTE) or LTE-Advanced (LTE-A), or mobile communication systems with different standards, e.g. Multistandard Radio (MSR), Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Code Division Multiple Access (CDMA), Orthogonal Frequency Division Multiple Access (OFDMA) or any other technology with a multiplexing capable physical layer like Filter Bank Based Multicarrier (FBMC) systems. Of course, also short range communication systems such as Nanotron (Chirp Spread Spectrum), ANT, DUST, Wireless HART, ISA100, Bluetooth or ZigBee may be used.

According to some embodiments of the invention, the common housing comprises a particular fixation structure which is adapted to attach the housing to a surface of the bearing ring such that the deformations of the surface region of the bearing ring are transformed into a corresponding deformation of a reference surface of the housing. That is, it may not be necessary to directly attach the deformation sensor to the surface of the bearing ring but to rather attach it to an appropriately manufactured common housing beforehand.

Embodiments of the present invention, hence, also comprise roller bearings having at least one measurement module according to any of the preceding embodiments attached to one bearing ring of the first and second bearing rings.

According to further embodiments of the present invention, roller bearings of the above type have additionally attached thereto one or more permanent magnets to the other bearing ring of the first and second bearing rings, so as to be able to provide a magnetic field of varying flux allowing to generate the required energy by the energy harvesting device of the module.

According to further embodiments, roller bearings comprise one measurement module on the first bearing ring and another measurement module on the second bearing ring, wherein both measurement modules comprise permanent magnets utilized to generate the magnetic field as required for the operation of the other measurement module.

BRIEF DESCRIPTION OF THE FIGURES

Some embodiments of apparatuses and/or methods will be described in the following by way of example only, and with reference to the accompanying figures, in which.

DETAILED DESCRIPTION OF THE PRESENT INVENTION

Various embodiments will now be described with reference to the accompanying figures in which only some exemplary embodiments are illustrated. For the sake of clarity, individual components, lines, layers and/or regions within the figures may not be drawn to scale.

It should be understood, however, that there is no intent to limit further embodiments to the particular implementations disclosed in the following figures. To the contrary, it is pointed out that further embodiments may use alternative implementations or modifications and equivalents of the implementations disclosed in the figures which fall within the scope of the invention. In particular, the fact that individual functionalities are described with respect to different entities, functional blocks or devices shall not be construed to mean that those entities are physically separated in all possible further embodiments of the present invention. Further embodiments may also unite several functionalities in a single entity, functional block or device. Also, multiple functionalities described with respect to one single entity, functional block or device may be distributed over multiple physically separated components in further embodiments or implementations.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting further embodiments. As used herein, the singular forms "a," "an" and "the" are intended to include the plural forms as well, unless the context clearly indicates otherwise. It will be further understood that the terms "comprises", "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein shall have the same meaning as commonly understood by one of ordinary skill in the particular art.

Like reference numbers refer to like or similar elements throughout the following description of the figures.

Figure 1:
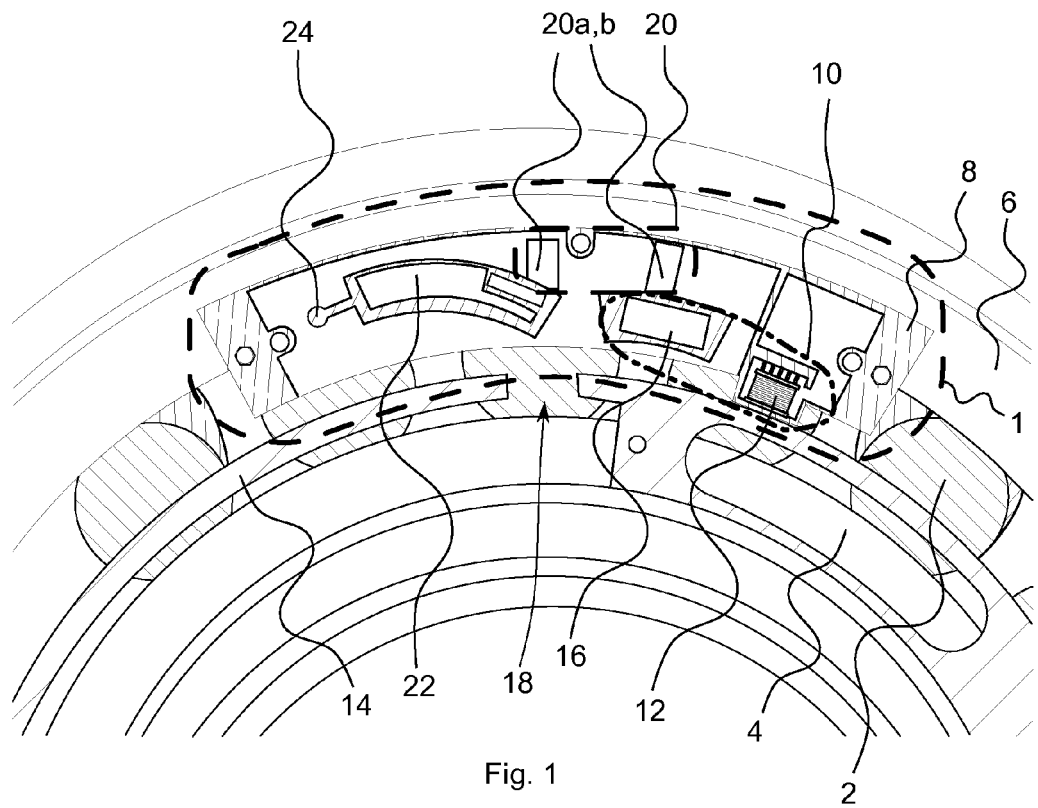
FIG. 1 shows an embodiment of a measurement module as attached to an outer ring of a roller bearing.

FIG. 1 shows a particular embodiment of a measurement module 1 as attached to a roller bearing having spherical rollers 2 placed between an inner bearing ring 4 and an outer bearing ring 6, which rotate with respect to each other around a rotation axis. The measurement module 1 comprises a common housing 8, enclosing or comprising the electronics and the individual sensors of the measurement module of FIG. 1. In particular, the measurement module 1 comprises an energy harvesting device 10 comprising one or a plurality of coils 12 in order to sense a magnetic field as generated by a variable reluctance ring 14 attached to the inner ring 4 by means of gluing, screwing or the like. When the inner and outer rings rotate with respect to each other, the variable reluctance ring 14 generates a varying magnetic flux at the coil 12, hence inducing a voltage, which is provided to a power harvesting electronic 16 in order to generate the power as required by the additional components of the measurement module. To this end, the power harvesting electronic 16 may comprise buffer capacitors, rectifiers, transformers or the like such as to provide an appropriate output voltage for the remaining devices or circuitry. It goes without saying that alternative embodiments may use an energy harvesting device 10 in which the associated electronics of the coil 12 and the power harvesting electronics are embodied within a single electric circuit or even on a single printed circuit board or die of semiconductor material.

According to the embodiment of FIG. 1, the signal as generated by the coil 12 or induced in the coil 12 is also utilized to determine the speed of the relative rotation between the inner ring 4 and the outer ring 6. The speed may be determined by measuring the frequency of the AC wave generated by the generator or energy harvesting device 10. Since the flux variation is given by the features in the opposing ring 14, the speed can be calculated. The gap 18 is introduced to allow for the application of another measurement unit with generator on the opposing ring. The appearance of a gap 18 in the variable reluctance ring 14 may be sensed and used for the determination of the associated frequency of the rotation and/or to establish the relative position (i.e. phase) of the opposing rings of the bearing. The embodiment of FIG. 1 utilizes two strain gauges 20a and 20b as a deformation sensor 20, which are attached to the surface of the outer ring 6 in order to determine deformations on the surface underneath the strain gauges 20a and 20b. These occur when the outer ring 6 deforms elastically such that the side face of the outer ring 6, i.e. the surface of the bearing ring having a surface normal parallel to the axis of the rotation bends outwards due to elastic deformation of the bearing ring. To this end, the deformation signal as directly determined by the strain gauges 20a and 20b is indicative of a deformation of a surface region of the outer ring 6, which is to one of the bearing rings of the roller bearing.

In order to perform the measurement and to provide a deformation signal, the deformation sensor, i.e. the strain gauges 20a and 20b are powered by the energy harvesting device 10. In order to provide the signal indicative of the deformation of the surface region, the strain gauges 20a and 20b may be directly connected to the surface region of the outer ring 6 of the bearing. To this end, the common housing 8 may provide an opening at the position of the surface region of the bearing. In further embodiments, however, the deformation sensor, i.e. the strain gauges 20a and 20b, may be directly connected to a reference surface of the common housing 8, while the common housing 8 comprises a fixation structure which is adapted to attach the housing to a surface of the bearing such that the deformations of the surface region of the bearing ring are transformed into corresponding deformations of the reference surface. To this end, in further embodiments, the housing may also comprise a material or component which is situated between the strain gauges 20a and 20b and the surface region of the outer ring 6.

The deformation signal as provided by the strain gauges 20a and 20b is used by an evaluation circuit 22 in order to determine a strain signal indicative of a present load on the bearing. That is, the evaluation circuit may evaluate a voltage or current change through the strain gauges in order to provide or to derive a signal, which is depending on the strain applied to the strain gauges. For example, the dependency may be essentially linear. Having a measure for an elongation or compression of the strain gauges, one may, using a finite element model of the roller bearing or the outer ring 6, conclude on a load as transferred by a spherical roller from the inner ring 4 to the outer ring 6. Hence, a vector of the load as supported by the bearing may be derived.

In the particular embodiment of a measurement module 1 as illustrated in FIG. 1, the common housing furthermore encloses an acoustical transducer 24, which is attached to the surface of the outer ring 6 in order to receive acoustic information as generated by the bearing. The frequency distribution of the acoustic signal and the intensity of the signal may allow to draw conclusions on the condition of the bearing, such as for example an expected remaining lifetime, the amount of additional grease required or the like. To this end, also the acoustical transducer 24 may be coupled to the evaluation circuit 22 in order to evaluate the information and to provide the associated information to a user, e.g. utilizing a wireless transmitter, which may be integrated with the evaluation circuit 22.

While FIG. 1 illustrates the common housing 8 in an open condition, i.e. where the housing is open such as to make the components within the housing visible, it goes without saying that further embodiments may also utilize housings which are sealed once and forever, that is housings that cannot be opened. In general, a common housing enclosing one or more of the devices of the monitoring module may be understood as a housing which completely encloses all of the devices or which only partly encloses one or all of the devices. That is, the housing may comprise openings in the direction of the bearing ring or openings on the opposite side, such as to provide access to, e.g., the strain gauges 20a and 20b or the energy harvesting circuit 10 for maintenance reasons or the like.

Embodiments of measurement modules according to the present invention may be glued, screwed, bolted, molded or soldered to one of the inner or outer rings. Generally, they may be mounted using any appropriate technique such as to fix the common housing to the surface of the inner ring 4 or the outer ring 6. It goes without saying that in further embodiments of roller bearings, the measurement module may as well be mounted to the inner ring 4 while the variable reluctance ring 14 is mounted to the outer ring 6.

In particular, when specifically tailoring a measurement module according to the present invention to a specific roller bearing, the shape, especially the curvature of the common housing 8 may be designed to correspond to the radius of the inner or outer rings. Furthermore, the distance of the strain gauges 20a and 20b to the side faces, i.e. the curved elements of the common housing 8, may be chosen or predetermined such that the strain gauges 20a and 20b come in place to an ideal position for performing side load measurements.

Figure 2:
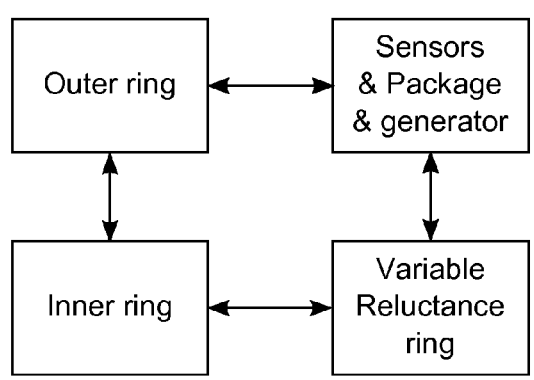
FIG. 2 shows a schematic sketch of the parameters to be considered to implement a measurement module as illustrated in FIG. 1.

The interdependencies that one may consider when designing a measurement module for a particular type of roller bearing are illustrated in FIG. 2. The basic geometry is defined by the inner and outer rings and their respective relative diameters and, in particular, by the gap provided between the inner and outer rings at the side faces thereof. Those particular dimensions may be utilized to design the size and the shape of the common housing 8 as well as the position of the individual sensors, in particular the position of the at least one deformation sensor within the common housing so that it is placed in an optimum position at the side face of the bearing ring. This optimum position may be determined beforehand, utilizing an FEM analysis of the roller bearing. Furthermore, the variable reluctance ring 14 or, in more general terms, the position of at least one permanent magnet on the inner ring 4 may be defined so that the energy harvesting device 10 may utilize the varying magnetic field to the maximum possible extent at a given geometry.

Figure 3:
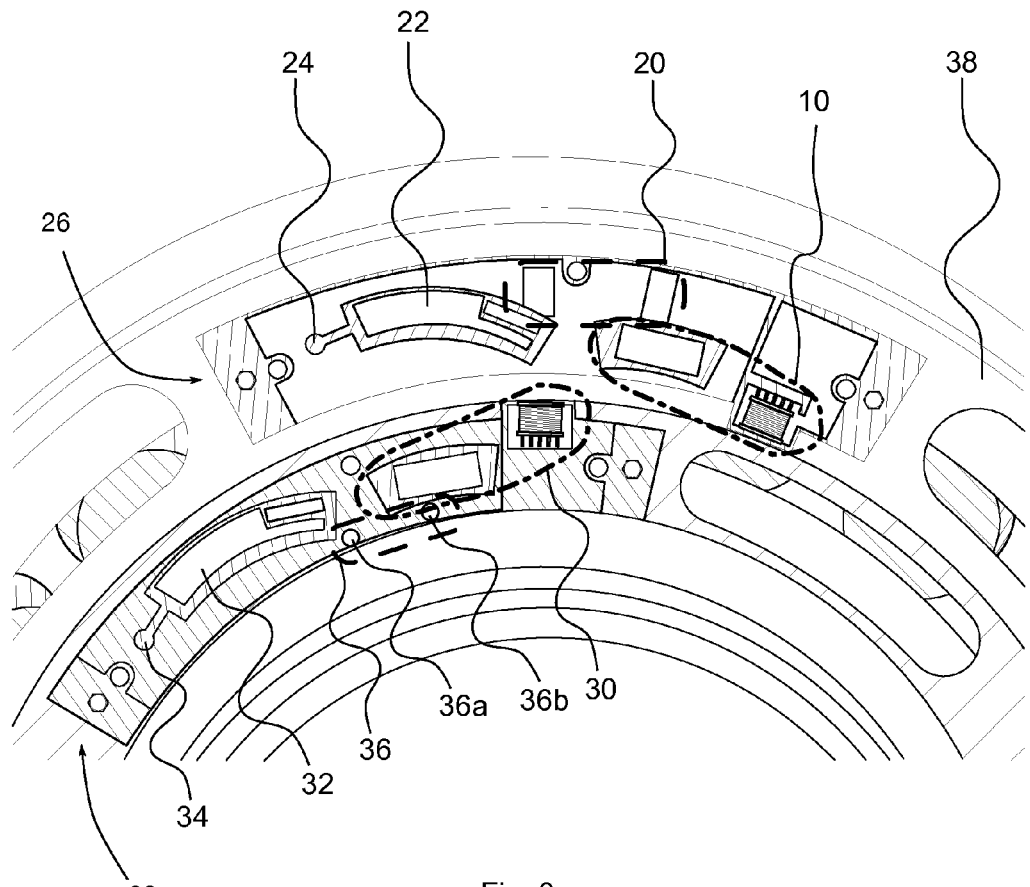
FIG. 3 shows an embodiment of a roller bearing having mounted thereto a measurement module on each of the inner and outer bearing rings.

FIG. 3 shows a further embodiment of the present invention, where two measurement modules 26 and 28 are mounted on opposing bearing rings of a roller bearing of the previously described type. Since the functionality of the first measurement module 26 corresponds to the one previously described with respect to FIG. 1, reference is made herewith to the corresponding description of FIG. 1. In addition to the embodiment shown in FIG. 1, the embodiment shown in FIG. 3 comprises a second measurement module 28, mounted to the inner ring 4. The second measurement module 28 comprises a second energy harvesting device 30 as well as a second evaluation circuit 32 in order to evaluate the signals as provided by a second acoustical transducer 34 and a second deformation sensor 36 comprising first and second strain gauges 36a and 36b. In order to provide the required magnetic field of varying flux to the second measurement module 28, the outer ring 6 has attached thereto a second variable reluctance ring 38.

Although powered by individual rings of magnetic material providing variable reluctance, further embodiments of the present invention may utilize measurement modules on either bearing ring which comprise at least one permanent magnet each. This may generate a considerable magnetic field at the position of the coil of the opposing measurement module, when the measurement modules transit with respect to each other. This may provide for the possibility to employ condition monitoring by simply attaching one measurement module on either bearing ring. This may save the cost and the effort to additionally equip each of the bearing rings 4 and 6 with a variable reluctance ring 14 or 38.

Figure 4:
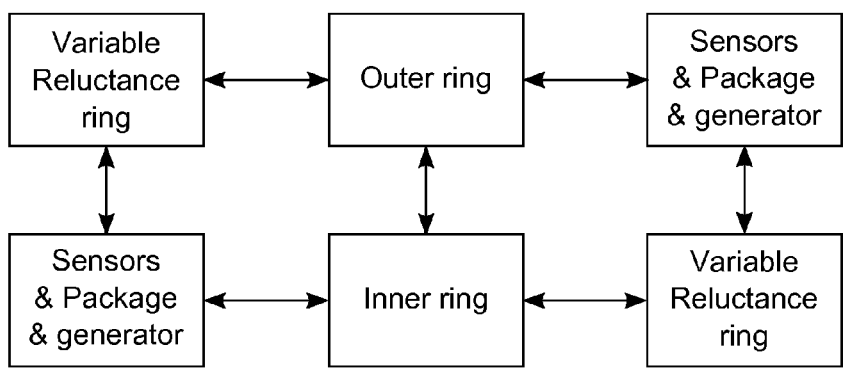
FIG. 4 shows a schematic sketch of the parameters to be considered to implement two measurement modules as illustrated in FIG. 3.

Similar to the illustration of FIG. 2, FIG. 4 shows the interdependencies when two measurement modules according to the embodiment of FIG. 3 are tailored to a particular roller bearing. Again, the basic geometry is provided by the dimensions of the inner and the outer rings, so that a variable reluctance has to be designed for fitting to the inner ring and to the outer ring, respectively. The dimensions and positions of the common housings have to be designed such that they fit to the dimensions of the ring to which they are attached and also to the geometry of the variable reluctance ring of the opposite bearing ring.

In other words, the interdependencies shown in FIGS. 2 and 4 can be described such that it is advisable to measure at specific locations in order to measure the strain on the bearing. In particular, these locations should allow side load measurement. For acoustic emission sensing, a transducer may be placed on the bearing itself, preferably on the inner or the outer ring or even on the seal, if the transmissibility is sufficient. Measurements may be transmitted wirelessly to other nodes and/or to a base station or relay node. For the power generation, the power generator or the energy harvesting device shall make use of the relative motion between the inner and the outer ring. An optimum placement of the measurement module integrating all these requirements, as again illustrated schematically in FIGS. 2 and 4, may be difficult to realize.

When using side load measurements to measure the load, these functions can be combined into one package, together with energy generation or energy harvesting, possibly even with acceleration measurements, acoustic emission measurement on the inner and outer rings. For the power generation and for a speed measurement, the relative movement between the inner and outer ring is used. Therefore, the location of the package may be determined by the load sensing position only, which can still be chosen to be optimal. The other functions may be gathered around that point as determined by the dimensions of the bearing and the relationship between the inner and outer rings. Utilizing a common housing may even allow for the misalignment of the bearing rollers, so that the rollers do not touch the enclosure and the generator ring, which may allow for a misalignment of the bearing by up to ±2° or more.

Using embodiments of measurement modules for condition monitoring of roller bearings may provide for extremely compact solutions, also avoiding EMC problems. Power may even be generated by both inner and outer rings simultaneously. Utilizing a single measurement module, the bearings' dynamic load and the bearings' roller ball pass mode can be detected, as well as the bearings loaded zones, which can also be monitored for changes on the inner ring or the outer ring package. The use of an energy harvesting devices negates the requirement for batteries or external power cabling or the like, making even condition monitoring of independently designed roller bearings feasible.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functions of various elements shown in the figures, including any functional blocks may be provided through the use of dedicated hardware, as e.g. a processor, as well as hard-ware capable of executing software in association with appropriate software. When pro-vided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Of course, some or all of the functions may also be implemented using dedicated analogue electronics, e.g. for performing, processing and transmitting measurements.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

LIST OF REFERENCE NUMBERS 1 measurement module
2 cylinder roller
4 inner ring
6 outer ring
8 common housing
10 energy harvesting device
12 coil
14 variable reluctance ring
16 power harvesting electronics
18 gap
20 deformation sensor
20a,b strain gauges
22 evaluation circuit
24 acoustical transducer and/or acceleration transducer
26 first measurement module
28 second measurement module
30 second energy harvesting device
32 second evaluation circuit
34 second acoustic transducer
36 second deformation sensor
36a,b strain gauges
38 second variable reluctance ring

The invention claimed is:

1. A measurement module for monitoring an operating condition of a roller bearing having a first bearing ring, a second bearing ring, and a plurality of rolling elements between the first and second bearing rings, the first and second bearing rings configured to rotate with respect to each other around a rotation axis, the module comprising:
a variable reluctance ring fixed to the first bearing ring, the variable reluctance ring having a first circumferential end and a second circumferential end such that the variable reluctance ring only has a single circumferential gap, the single circumferential gap being located between the first and second circumferential ends, and wherein the variable reluctance ring radially overlaps the plurality of rolling elements;
an energy harvesting device fixed to the second bearing ring and operable to generate energy from a relative movement between the energy harvesting device and the variable reluctance ring;
at least one deformation sensor operable to provide a deformation signal indicative of a deformation of a surface region of the second bearing ring, the deformation sensor being powered by the energy harvesting device;
an evaluation circuit operable to determine, using the deformation signal, a strain signal indicative of a present load on the bearing, the evaluation circuit being powered by the energy harvesting device; and
a common housing enclosing the energy harvesting device, the deformation sensor and the evaluation circuit.

2. The module of claim 1, wherein the energy harvesting device is operable to generate energy from a magnetic field of varying flux.

3. The module of claim 1, the deformation sensor further comprising at least one strain gauge.

4. The module of claim 1, further comprising an acoustical transducer, the acoustical transducer being enclosed within the common housing and powered by the energy harvesting device.

5. The module of claim 1, further comprising a temperature sensor, the temperature sensor being enclosed within the common housing and powered by the energy harvesting device.

6. The module of claim 1, further comprising a wireless transmitter coupled with the evaluation circuit, the wireless transmitter being operable to transmit the load signal or an information on the load signal to a corresponding transceiver, wherein the wireless transmitter is enclosed within the common housing and powered by the energy harvesting device.

7. The module of claim 1, further comprising one or more permanent magnets.

8. The module of claim 1, wherein the deformation sensor is operable to determine a deformation of a surface region which is essentially perpendicular to the rotation axis.

9. The module of claim 1, the common housing further comprising a fixation structure adapted to attach the common housing to a surface of the second bearing ring such that deformations of the surface region of the second bearing ring are transformed into corresponding deformations of a reference surface of the common housing.

10. The module of claim 9, wherein the deformation sensor is operable to determine the deformation of the reference surface.

11. The module of claim 1, the energy harvesting device further comprising at least one coil.

12. The module of claim 1, wherein the module is specifically designed for one of a particular roller bearing or a particular bearing type such that the deformation sensor is located on a surface region of the bearing where the deformation of the surface depends on a load on the bearing according to a predetermined relationship.

13. The module of claim 12, wherein the dependency is essentially linear.

14. The module of claim 12, wherein at least one of a position and size of the surface region on the second bearing ring is determined by a finite element analysis of the roller bearing.

15. The module of claim 12, wherein a contour of the common housing has at least partly the form of a circular arc with a radius corresponding to the radius of the second bearing ring, wherein a distance of a position of the deformation sensor to the circular arc is chosen such that the deformation sensor is located at or above the surface region when the common housing is mounted on the second bearing ring such that the circular arc is aligned with the radius of the second bearing ring.

16. The module of claim 1, further comprising an electrical coupling between the energy harvesting device and the deformation sensor performed within the common housing.

17. A roller bearing having a measurement module, the roller bearing comprising:
 a first bearing ring and a second bearing ring rotating with respect to each other around a rotation axis;
 a plurality of rolling elements disposed between the first and second bearing rings;
 the measurement module comprising:
  a variable reluctance ring fixed to the first bearing ring, the variable reluctance ring having a first circumferential end and a second circumferential end such that the variable reluctance ring only has a single circumferential gap, the single circumferential gap being located between the first and second circumferential ends, and wherein the variable reluctance ring radially overlaps the plurality of rolling elements;
  an energy harvesting device fixed to the second bearing ring and operable to generate energy from a relative movement between the energy harvesting device and the variable reluctance ring,
  at least one deformation sensor operable to provide a deformation signal indicative of a deformation of a surface region of the second bearing ring, the deformation sensor being powered by the energy harvesting device,
  an evaluation circuit operable to determine, using the deformation signal, a strain signal indicative of a present load on the bearing, the evaluation circuit being powered by the energy harvesting device; and
  a common housing enclosing the energy harvesting device, the deformation sensor and the evaluation circuit,
 wherein the measurement module is attached to the second bearing ring.

18. The roller bearing of claim 17, having one or more permanent magnets attached to the first bearing ring.

19. The roller bearing of claim 17, further comprising a second measurement module, wherein the second measure module is attached to the first bearing ring.

* * * * *